United States Patent
Sano et al.

(10) Patent No.: US 11,713,015 B2
(45) Date of Patent: Aug. 1, 2023

(54) VEHICLE SEAT

(71) Applicants: HONDA MOTOR CO., LTD., Tokyo (JP); TS TECH CO., LTD., Saitama (JP)

(72) Inventors: Koji Sano, Tokyo (JP); Yusuke Chida, Tokyo (JP); Atsushi Yamabe, Tochigi (JP)

(73) Assignees: HONDA MOTOR CO., LTD., Tokyo (JP); TS TECH CO., LTD., Saitama (JP)

( * ) Notice: Subject to any disclaimer, the term of this patent is extended or adjusted under 35 U.S.C. 154(b) by 0 days.

(21) Appl. No.: 18/055,846

(22) Filed: Nov. 16, 2022

(65) Prior Publication Data

US 2023/0158990 A1    May 25, 2023

(30) Foreign Application Priority Data

Nov. 23, 2021 (CN) .......................... 202111393472.4

(51) Int. Cl.
*B60R 21/207* (2006.01)
*B60N 2/58* (2006.01)

(52) U.S. Cl.
CPC .............. *B60R 21/207* (2013.01); *B60N 2/58* (2013.01); *B60N 2002/5808* (2013.01)

(58) Field of Classification Search
None
See application file for complete search history.

(56) References Cited

U.S. PATENT DOCUMENTS

| | | | | |
|---|---|---|---|---|
| 6,045,151 A | * | 4/2000 | Wu | B60R 21/207 280/730.2 |
| 6,206,410 B1 | * | 3/2001 | Brown | B60R 21/207 297/216.13 |
| 7,669,889 B1 | * | 3/2010 | Gorman | B60R 21/207 280/730.2 |
| 8,113,539 B2 | * | 2/2012 | Paruszkiewicz | B60N 2/58 280/730.2 |
| 10,000,176 B2 | * | 6/2018 | Buelow | B60N 2/58 |
| 10,173,562 B2 | * | 1/2019 | Tanabe | B60N 2/68 |

FOREIGN PATENT DOCUMENTS

JP    4544089 B2    9/2010

* cited by examiner

*Primary Examiner* — Faye M Fleming
(74) *Attorney, Agent, or Firm* — CKC & Partners Co., LLC

(57) ABSTRACT

A vehicle seat includes a first webbing provided in a side portion of a seat back, and a second webbing provided in the side portion of the seat back so as to overlap the first webbing from outside. The first webbing and the second webbing form a bag portion that opens downward, which houses a side airbag device. The bag portion includes a webbing seam portion in which edge portions of the first webbing and the second webbing are sewn together. In a skin seam portion in which skins of a seat back skin constituting skin of the seat back are sewn together, the webbing seam portion is sewn together with the skins, in a state in which the first webbing overlaps one of the skins and the second webbing overlaps the other of the skins.

6 Claims, 5 Drawing Sheets

VEHICLE SEAT

This application is based on and claims the benefit of priority from Chinese Patent Application No. CN202111393472.4, filed on 23 Nov. 2021, the content of which is incorporated herein by reference.

BACKGROUND OF THE INVENTION

Field of the Invention

The present invention relates to a vehicle seat provided with a side airbag.

Related Art

In the invention disclosed in Patent Document 1 below, a webbing composed of first webbings and second webbings is provided so as to surround the periphery of a side airbag device provided in a shoulder opening of a seat back. The first webbings are respectively formed into tip-widening shapes that widen from a pair of fixed edges toward seam edges in the unfolded state. The second webbings are respectively formed into belt shapes which are narrower than the seam edges in the unfolded state.

The first webbings respectively extend from the fixed edges attached on a seat back frame side to a front skin side and a side skin side of a door-side side portion, which are the deployment directions of the airbag bag body in the side airbag device, and are sewn together with the seam portion of the front skin and the side skin, at the seam edges of the first webbings which are wider than the fixed edges. The second webbings respectively extend from fixed edges fixed to a fixing fitting together with the first webbings to the front skin side and the side skin side of the door-side side portion along the outside of the first webbings, and are sewn together with the seam portion of the front skin and the side skin.

With such a configuration, in the vehicle seat disclosed in Patent Document 1 below, even when the airbag bag body of the side airbag device is deployed toward a position slightly displaced from the starting point where the seam portion begins to split open, and the inflation pressure is applied to the position, the seam portion can be split open. That is, the vehicle seat of Patent Document 1 below enables the seat back skin to be reliably split open even if there is variation in the deployment direction of the airbag bag body when the side airbag device is activated.

Patent Document 1: Japanese Patent No. 4544089

SUMMARY OF THE INVENTION

In the conventional case, by combining the first webbing and the second webbing, energy when the airbag bag body is inflated laterally can be transferred to the starting point where the seam portion begins to split open. However, in the conventional case, since the upper portion of the side airbag device is not covered with a webbing, energy when the airbag bag body is inflated upwardly cannot be sufficiently transferred to the starting point where the seam portion begins to split open.

An object of the present invention is to provide a vehicle seat allowing a seat back skin to be reliably torn open when a side airbag of a side airbag device is inflated not only laterally but also upwardly.

(1) A first aspect of the present invention provides a vehicle seat provided with a side airbag device. The vehicle seat includes a first webbing provided in a side portion of a seat back, and a second webbing provided in the side portion of the seat back so as to overlap the first webbing from outside. The first webbing and the second webbing form a bag portion that opens downward. The bag portion houses the side airbag device. The bag portion includes a webbing seam portion in which edge portions of the first webbing and the second webbing are sewn together. In a skin seam portion in which skins of a seat back skin constituting skin of the seat back are sewn together, the webbing seam portion is sewn together with the skins, in a state in which the first webbing overlaps one of the skins and the second webbing overlaps the other of the skins.

(2) In a second aspect of the present invention according to the first aspect, the first webbing and the second webbing may have different sizes. In a region in which the bag portion is not formed in a larger one of the first webbing and the second webbing, a fixing point for fixing the larger one to a seat back frame may be provided on an edge side other than an edge side of the larger one on a skin seam portion side.

(3) In a third aspect of the present invention according to the first or second aspect, the first webbing and the second webbing may have different sizes. In a smaller one of the first webbing and the second webbing, an edge portion at which the bag portion opens may be inclined rearwardly upward.

(4) In a fourth aspect of the present invention according to any one of the first to third aspects, an inflator may be provided in the side portion of the seat back. An outlet of the inflator may be inserted into the bag portion through an opening of the bag portion.

(5) In a fifth aspect of the present invention according to any one of the first to fourth aspects, the first webbing may have a first sewn portion on a side opposite to a skin seam portion side. The second webbing may have a second sewn portion on the side opposite to the skin seam portion side. The bag portion may include the webbing seam portion and a seam portion in which the first sewn portion and the second sewn portion are sewn together.

(6) In a sixth aspect of the present invention according to the fifth aspect, a reinforcing cloth portion may be sewn to an opening of the bag portion.

According to the present invention, it is possible to provide a vehicle seat allowing a seat back skin to be reliably torn open when a side airbag of a side airbag device is inflated not only laterally but also upwardly.

DETAILED DESCRIPTION OF THE INVENTION

Hereinafter, specific embodiments of the present invention will be described in detail with reference to the drawings.

Figure 1:
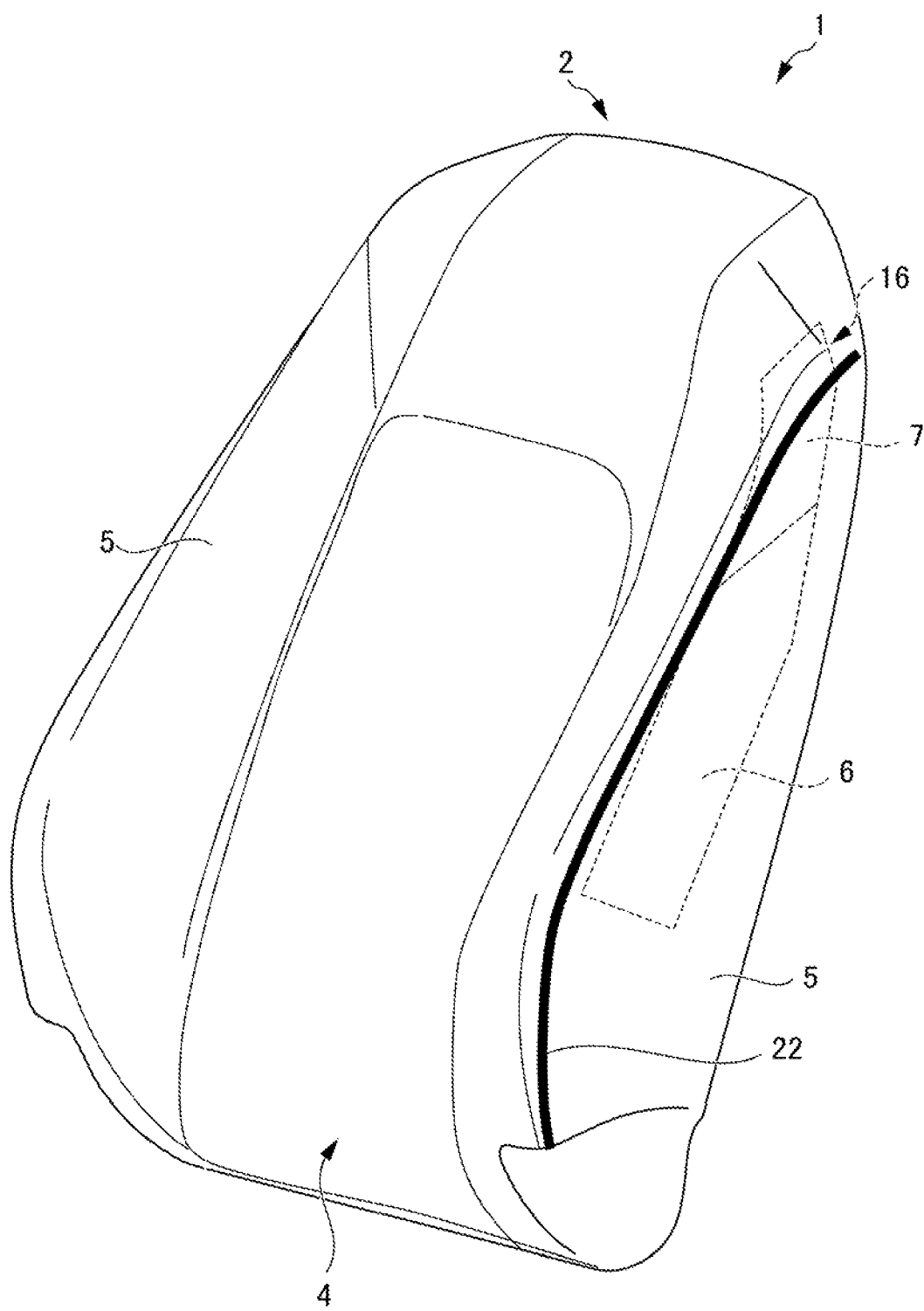
FIG. 1 is a schematic perspective view showing a seat back of a vehicle seat according to an embodiment of the present invention.
Figure 2:
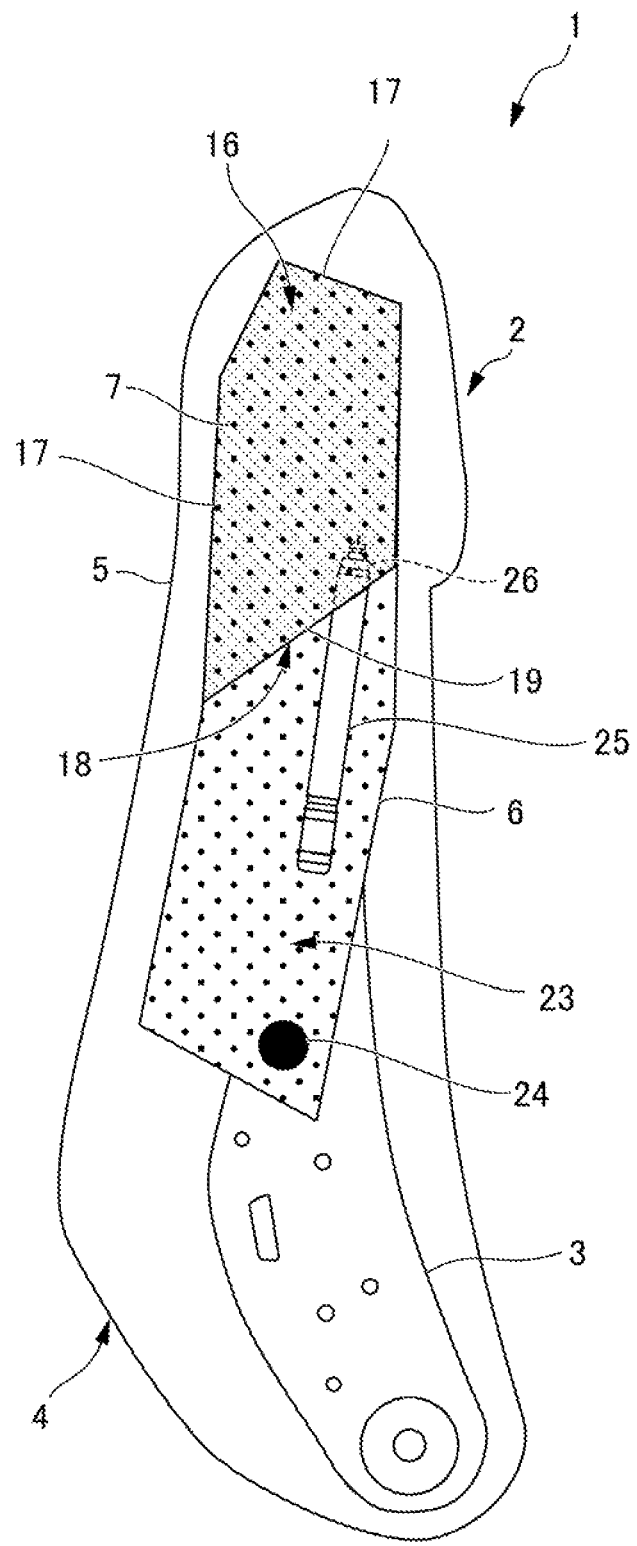
FIG. 2 is a schematic side view showing the interior of the seat back of the vehicle seat according to the embodiment of the present invention.

FIGS. 1 and 2 show a seat back of a vehicle seat according to an embodiment of the present invention. FIG. 1 is a schematic perspective view, and FIG. 2 is a schematic right side view showing the interior of the seat back. A vehicle seat 1 of the present embodiment is a seat of an automobile, and includes a seat cushion (not shown), which is a seat surface portion, and a seat back 2 provided at a rear end of the seat cushion so as to be reclinable in the front-rear direction.

The seat cushion has a conventionally known configuration in which a cushion pad covered with a skin material is mounted on a frame. The seat cushion is detachable from the vehicle body.

The seat back 2 is a backrest portion, and includes a seat back frame 3, a seat back pad (not shown) covering the seat back frame 3, and a seat back skin 4 covering the seat back pad. The seat back frame 3 is a framework of the seat back 2, and is formed of, for example, a metal material. The seat back pad is a cushion and is formed of foam such as urethane foam. The seat back skin 4 is a member constituting the skin of the seat back 2, and is formed of, for example, leather.

The seat back 2 is formed with side portions 5, 5, positioned to the left and right of the center in the left-right direction, the width direction of the vehicle, bulging forward. A side airbag device (not shown) is provided in the side portion 5 of the seat back 2 positioned on a center console side.

Figure 3:
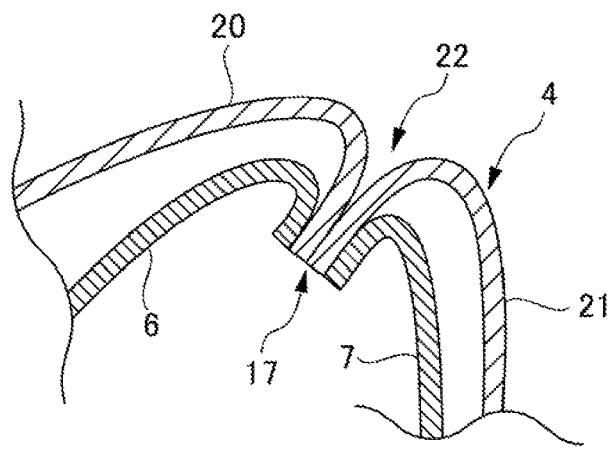
FIG. 3 is a schematic transverse cross-sectional view showing a seam portion between webbings and a seat back skin.
Figure 4:
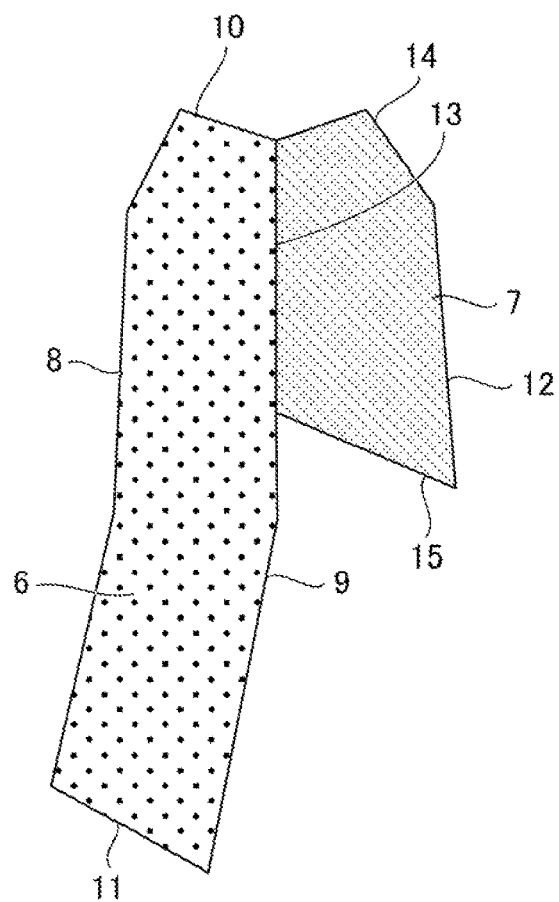
FIG. 4 is an explanatory view showing an unfolded state of the webbings.

Therefore, the vehicle seat 1 provided with the side airbag device of the present embodiment includes a first webbing 6 and a second webbing 7 provided in the side portion 5 of the seat back 2 positioned on the center console side. FIG. 3 is a schematic transverse cross-sectional view showing a seam portion between the webbings and the seat back skin. FIG. 4 is an explanatory view showing an unfolded state of the webbings.

In the vehicle seat 1 of the present embodiment, the first webbing 6 and the second webbing 7 have different sizes. In the illustrated example, the first webbing 6 is formed larger than the second webbing 7.

The first webbing 6 has a substantially rectangular sheet shape elongated in the vertical direction in side view, and has a shape in which a substantially central portion in the vertical direction has a bend such that a lower portion of the first webbing 6 extends in a direction forward of the vertical direction. The first webbing 6 includes an edge portion 8 (hereinafter referred to as a front edge portion) positioned on the front side, an edge portion 9 (hereinafter referred to as a rear edge portion) positioned on the rear side, an edge portion 10 (hereinafter referred to as an upper edge portion) connecting the upper end portion of the front edge portion 8 and the upper end portion of the rear edge portion 9, and an edge portion 11 (hereinafter referred to as a lower edge portion) connecting the lower end portion of the front edge portion 8 and the lower end portion of the rear edge portion 9. In the side portion 5 of the seat back 2 positioned on the center console side, the first webbing 6 is disposed such that the longitudinal direction thereof is along the vertical direction.

The second webbing 7 has a substantially rectangular sheet shape in side view and a length in the vertical direction shorter than the length in the vertical direction of the first webbing 6. As shown in FIG. 2, the second webbing 7 is provided so as to overlap the first webbing 6 from the outside. When the front-rear direction of the second webbing 7 is defined in the overlapped state, as shown in FIG. 4, the second webbing 7 includes an edge portion 12 positioned on the front side (hereinafter referred to as a front edge portion), an edge portion 13 positioned on the rear side (hereinafter referred to as a rear edge portion), an edge portion 14 (hereinafter referred to as an upper edge portion) connecting the upper end portion of the front edge portion 12 and the upper end portion of the rear edge portion 13, and an edge portion 15 (hereinafter referred to as a lower edge portion) connecting the lower end portion of the front edge portion 12 and the lower end portion of the rear edge portion 13. In the present embodiment, the upper portion of the rear edge portion 9 of the first webbing 6 and the rear edge portion 13 of the second webbing 7 are connected to each other. That is, the first webbing 6 and the second webbing 7 are formed from a single piece of cloth.

The first webbing 6 and the second webbing 7 form a bag portion 16 that opens downward. Specifically, in a state in which the first webbing 6 and the second webbing 7 overlap each other, the upper portion of the front edge portion 8 of the first webbing 6 and the front edge portion 12 of the second webbing 7 are sewn together, and the upper edge portion 10 of the first webbing 6 and the upper edge portion 14 of the second webbing 7 are sewn together, and the first webbing 6 and the lower edge portion 15 of the second webbing 7 are not sewn together, whereby the bag portion 16 having a substantially rectangular shape in side view and opening downward is formed at the position of the upper portion of the first webbing 6. The bag portion 16 formed in this manner has a webbing seam portion 17 in which edge portions of the first webbing 6 and the second webbing 7 are sewn together. A side airbag device is housed in the bag portion 16 through a downward opening 18. In the present embodiment, the first webbing 6 and the second webbing 7 are formed from one piece of cloth, but the first webbing and the second webbing may be formed from different pieces of cloth(s). In this case, edge portions of the first webbing and the second webbing are sewn together so as to form a bag portion having a downward opening.

In the vehicle seat 1 of the present embodiment, the lower edge portion 15 of the second webbing 7 is inclined rearwardly upward in a state in which the first webbing 6 and the second webbing 7 overlap each other. Accordingly, in the second webbing 7, an edge portion 19 where the bag portion 16 opens is inclined rearwardly upward.

As shown in FIGS. 1 and 3, in the side portion 5 of the seat back 2 positioned on the center console side, the seat back skin 4 includes a first skin 20 that covers the front side of the seat back 2, and a second skin 21 that covers from the lateral side to the rear side of the seat back 2, and a skin seam portion 22 in which the first skin 20 and the second skin 21 are sewn together is formed. In this way, the skin seam portion 22 in which skins of the seat back skin 4 are sewn together is formed on the front side of the side portion 5 of the seat back 2 positioned on the center console side.

As mentioned above, since the side airbag device is housed in the bag portion 16, the webbing seam portion 17 and the skin seam portion 22 overlap each other so that the side airbag of the side airbag device is deployed and inflated from the inside of the side portion 5 of the seat back 2 to bulge to the outside. Specifically, in the skin seam portion 22 in which the skins of the seat back skin 4 are sewn together, the front-side portion which is a part of the webbing seam portion 17 in which the edge portions of the first webbing 6 and the second webbing 7 are sewn together, is sewn together with the skins, in a state in which the front edge portion 8 of the first webbing 6 overlaps the end portion of the first skin 20 which is one skin, and the front edge portion 12 of the second webbing 7 overlaps the end portion of the second skin 21 which is the other skin.

As shown in FIG. 2, in a region 23 of the first webbing 6 in which the bag portion 16 is not formed, a fixing point 24 for fixing the first webbing 6 to the seat back frame 3 is provided on an edge portion side other than the edge portion side of the first webbing 6 on the skin seam portion 22 side. In the present embodiment, in the region 23, the fixing point 24 is provided on the lower edge portion 11 side or the rear edge portion 9 side other than the front edge portion 3 side of the first webbing 6. For example, as shown in FIG. 2, the fixing point 24 is provided on the rear side of the lower end portion of the first webbing 6. The first webbing 6 is fixed to the seat back frame 3 at the fixing point 24. At this time, the first webbing 6 may be fixed to the seat back frame 3 with a bolt and a nut, or may be fixed to the seat back frame 3 by clip fastening. In the illustrated example, one fixing point is used, but the present invention is not limited thereto, and a plurality of fixing points may be used.

As shown in FIG. 2, an inflator 25 is provided in the side portion 5 of the seat back 2 positioned on the center console side. The inflator 25 is fixed to the seat back frame 3. In this fixed state, an outlet 26 of the inflator 25 is inserted into the bag portion 16 through the opening 18 of the bag portion 16.

In the vehicle seat 1 of the present embodiment, the side airbag device is housed in the bag portion 16 formed by the first webbing 6 and the second webbing 7. The webbing seam portion 17, in which the first webbing 6 and the second webbing 7 are sewn together, and the skin seam portion 22, in which the skins of the seat back skin 4 are sewn together, overlap each other. Accordingly, in the vehicle seat 1 of the present embodiment, not only the force applied in the lateral direction but also the force applied in the upward direction can be fully absorbed when the side airbag is deployed, and the absorbed force can be concentrated on the part in which the webbing seam portion 17 and the skin seam portion 22 overlap each other to smoothly tear open the seat back skin 4 when the side airbag is deployed.

Further, in the vehicle seat 1 of the present embodiment, the fixing point 24 for fixing the first webbing 6 to the seat back frame 3 is provided on the lower edge portion 11 side or the rear edge portion 9 side of the first webbing 6 in the region 23 in which the bag portion 16 of the first webbing 6 is not formed. Thus, in the vehicle seat 1 of the present embodiment, the inflation force of the side airbag applied to the bag portion 16 can be transferred to the part in which the webbing seam portion 17 and the skin seam portion 22 overlap each other without being released.

Further, in the vehicle seat 1 of the present embodiment, in the second webbing 7, the edge portion 19 where the bag portion 16 opens is inclined rearwardly upward. In other words, the edge portion (front edge portion 12) of the second webbing 7 on the skin seam portion 22 side is formed longer than the rear edge portion 13 of the second webbing 7 in the vertical direction. Thus, according to the vehicle seat 1 of the present embodiment, it is possible to minimize the size of the second webbing 7 while increasing the transfer efficiency of the force at the time of inflation of the seat back 2.

Further, in the vehicle seat 1 of the present embodiment, the gas outlet 26 of the inflator 25 is inserted into the bag portion 16. Thus, according to the vehicle seat 1 of the present embodiment, since the air exiting from the outlet 26 of the inflator 25 hits the bag portion 16, the seat back skin 4 can be more reliably torn open.

Figure 5:
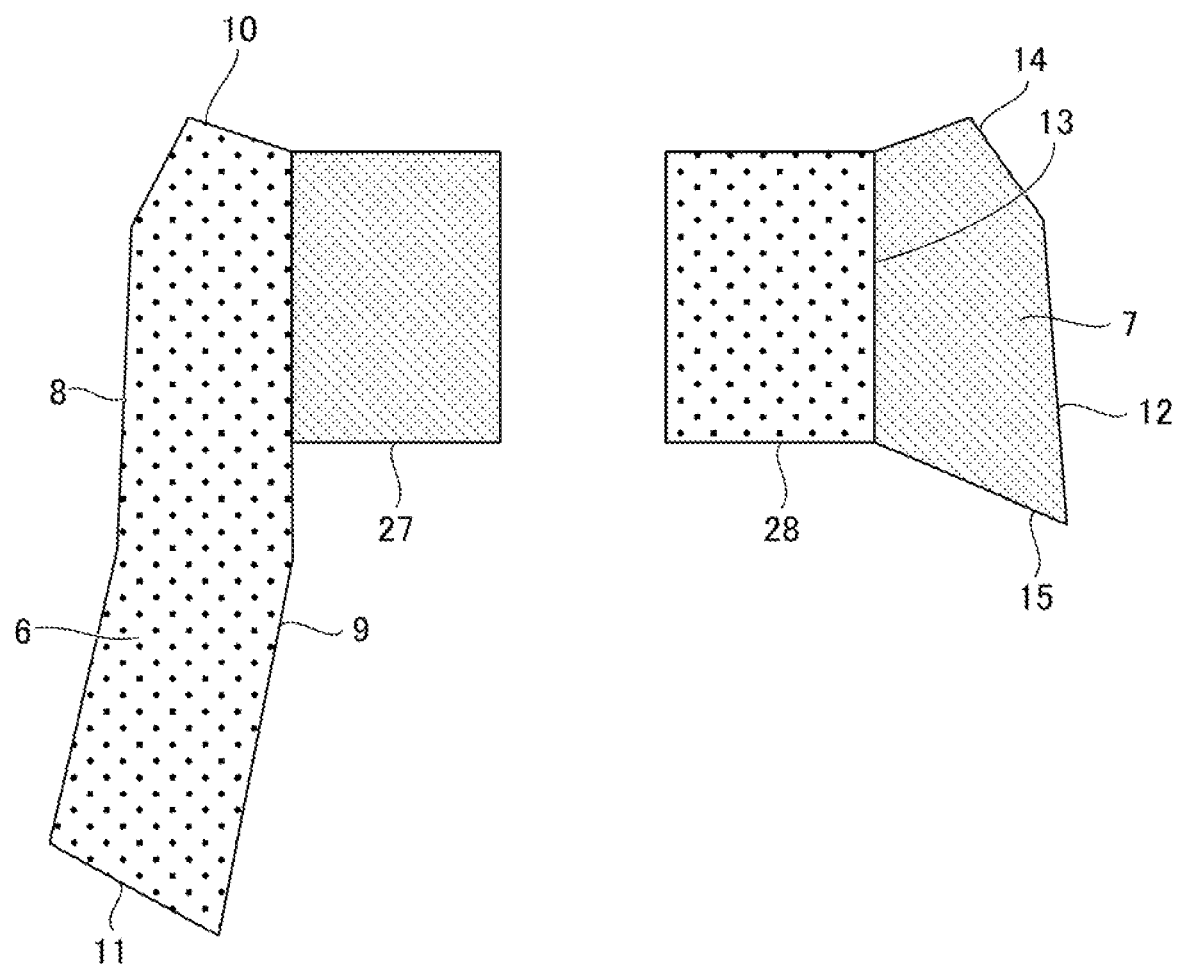
FIG. 5 is an explanatory view showing webbings used in a vehicle seat according to another embodiment of the present invention.
Figure 6:
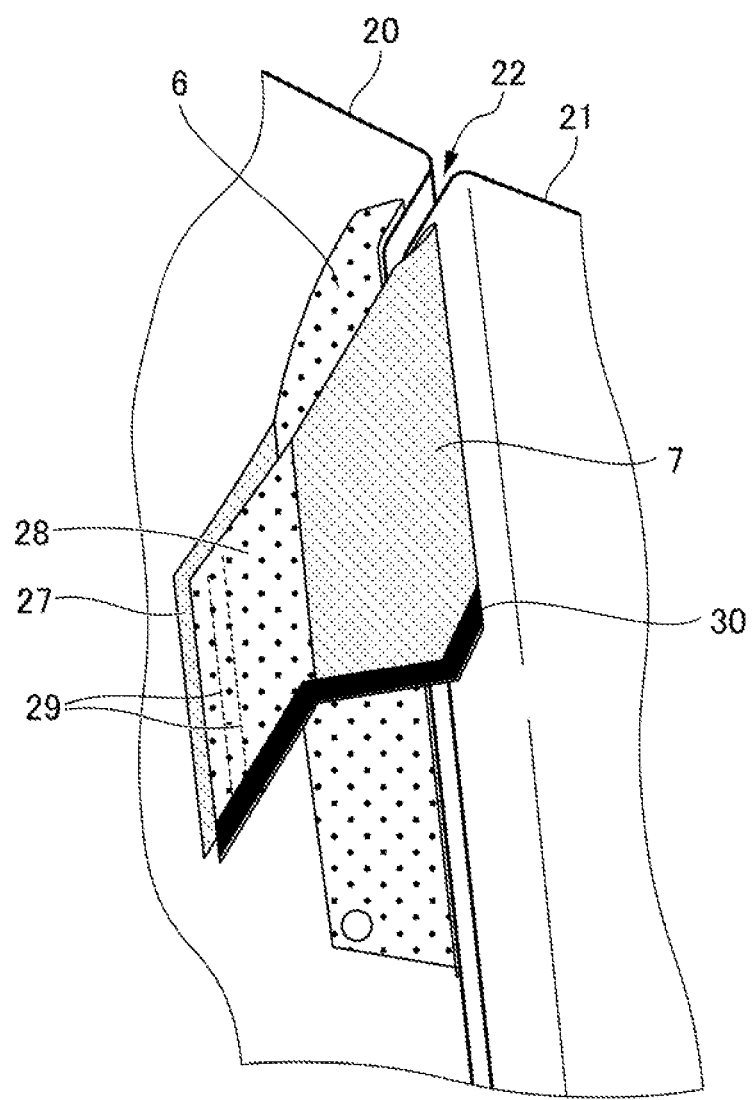
FIG. 6 is a schematic perspective view showing the webbings in FIG. 5 and a seat back skin in the process of being sewn together.

Another embodiment of the vehicle seat of the present invention will be described. FIG. 5 is an explanatory view showing webbings used in a vehicle seat according to the other embodiment of the present invention. FIG. 6 is a schematic perspective view showing the webbings in FIG. 5 and the seat back skin in the process of being sewn together, as viewed from the rear. That is, FIG. 6 shows the bag portion in the process of being formed. In the present embodiment, the characteristic features will be described, and the description of the matters described in the above embodiment will be omitted.

In the present embodiment, the configuration of the webbing is different from that of the above embodiment. As shown in FIGS. 5 and 6, in the first webbing 6, a first sewn portion 27 is formed on the side opposite to the skin seam portion 22 side. The first sewn portion 27 is cloth having a substantially rectangular shape in side view, and is formed to extend rearward from the upper portion of the rear edge portion 9 of the first webbing 6. In the present embodiment, the first webbing 6 and the first sewn portion 27 are formed from one piece of cloth, but may be formed from different pieces of cloth(s). In the second webbing 7, a second sewn portion 28 is formed on the side opposite to the skin seam portion 22 side. The second sewn portion 28 is cloth having a substantially rectangular shape in side view, and is formed to extend rearward from the rear edge portion 13 of the second webbing 7. In the present embodiment, the second webbing 7 and the second sewn portion 28 are formed from one piece of cloth, but may be formed from different pieces of cloth(s).

The first webbing 6 in which the first sewn portion 27 is formed and the second webbing 7 in which the second sewn portion 28 is formed form the bag portion 16 that opens downward in the same manner as in the above embodiment. When the bag portion 16 is formed, in a state in which the first webbing 6 and the second webbing 7 overlap each other, and the first sewn portion 27 and the second sewn portion 28 overlap each other, the upper portion of the front edge portion 8 of the first webbing 6 and the front edge portion 12 of the second webbing 7 are sewn together, and the upper edge portion 10 of the first webbing 6 and the upper edge portion 14 of the second webbing 7 are sewn together, and the first sewn portion 27 and the second sewn portion 28 are sewn together such that seams run along the vertical direction on the rear side. Accordingly, the bag portion 16 includes the webbing seam portion 17 in which the edge portions of the first webbing 6 and the second webbing 7 are sewn together, and a seam portion 29 in which seams run along the vertical direction.

When the bag portion 16 is formed, as in the case of the above-described embodiment, the seam portion between the upper portion of the front edge portion 8 of the first webbing 6 and the front edge portion 12 of the second webbing 7 and the skin seam portion 22 overlap each other. That is, the upper portion of the front edge portion 8 of the first webbing 6 and the front edge portion 12 of the second webbing 7 are sewn together with the skins in a state in which the front edge portion 8 of the first webbing 6 overlap the end portion of the first skin 20 which is one skin and the front edge portion 12 of the second webbing 7 overlap the end portion of the second skin 21 which is the other skin.

In the present embodiment, the configuration of the bag portion 16 differs from that of the above embodiment. As shown in FIG. 6, a reinforcing cloth portion 30 made of cloth is sewn to the downward opening 18 of the bag portion 16. Specifically, the reinforcing cloth portion 30 is sewn to the outside of the part composed of the second webbing 7 and the second sewn portion 28 at the opening 18 of the bag portion 16. That is, at the lower end portion of the second webbing 7 and the lower end portion of the second sewn portion 28, the reinforcing cloth portion 30 having a strip shape is sewn from the second webbing 7 to the second sewn portion 28. In addition, a reinforcing cloth portion (not shown) is sewn to the outside of the part composed of the first webbing 6 and the first sewn portion 27 at the opening 18 of the bag portion 16.

In the present embodiment, the reinforcing cloth portion is provided on the part composed of the first webbing 6 and the first sewn portion 27, and the reinforcing cloth portion 30 is provided on the part composed of the second webbing 7 and the second sewn portion 28, but the reinforcing cloth portion provided on the part composed of the first webbing 6 and the first sewn portion 27 and the reinforcing cloth portion 30 provided on the part composed of the second webbing 7 and the second sewn portion 28 may be integrated. Further, in the present embodiment, the reinforcing cloth portion is provided outside the part composed of the first webbing 6 and the first sewn portion 27, and the reinforcing cloth portion 30 is provided outside the part composed of the second webbing 7 and the second sewn portion 28, but the reinforcing cloth portion may be provided inside the part composed of the first webbing 6 and the first sewn portion 27, and the reinforcing cloth portion may be provided inside the part composed of the second webbing 7 and the second sewn portion 28.

In the present embodiment, when the bag portion 16 is formed, the first sewn portion 27 and the second sewn portion 28 are sewn together at the rear of the bag portion 16. Therefore, the webbings can be sewn together easily, and the bag portion 16 can be easily formed.

Further, in the present embodiment, the reinforcing cloth portions are provided so as to surround the opening 18 of the bag portion 16. Therefore, it is possible to prevent the webbings from being broken due to the concentration of the load on the lower portion of the bag portion 16 when the side airbag device in the bag portion 16 deploys.

The present invention is not limited to the above embodiments, and modifications and improvements are included in the present invention to the extent that the object of the present invention can be achieved.

For example, in each of the above embodiments, the first webbing 6 is formed larger than the second webbing 7, but conversely, the second webbing may be formed larger than the first webbing. In this case, the second webbing has a fixing point. Further, the edge portion of the first webbing where the bag portion opens is inclined rearwardly upward.

EXPLANATION OF REFERENCE NUMERALS

1: vehicle seat
2: seat back
3: seat back frame
4: seat back skin
5: side portion
6: first webbing
7: second webbing
16: bag portion
17: webbing seam portion
18: opening
19: edge portion
22: skin seam portion
23: region
24: fixing point
25: inflator
26: outlet
27: first sewn portion
28: second sewn portion
29: seam portion
30: reinforcing cloth portion

What is claimed is:

1. A vehicle seat provided with a side airbag device, the vehicle seat comprising:
    a first webbing provided in a side portion of a seat back; and
    a second webbing provided in the side portion of the seat back so as to overlap the first webbing from outside,
    the first webbing and the second webbing forming a bag portion that opens downward, the bag portion housing the side airbag device,
    the bag portion including a webbing seam portion in which edge portions of the first webbing and the second webbing are sewn together, and
    in a skin seam portion in which skins of a seat back skin constituting skin of the seat back are sewn together, the webbing seam portion being sewn together with the skins, in a state in which the first webbing overlaps one of the skins and the second webbing overlaps the other of the skins.

2. The vehicle seat according to claim 1,
    wherein the first webbing and the second webbing have different sizes, and
    wherein, in a region in which the bag portion is not formed in a larger one of the first webbing and the second webbing, a fixing point for fixing the larger one to a seat back frame is provided on an edge side other than an edge side of the larger one on a skin seam portion side.

3. The vehicle seat according to claim 1,
    wherein the first webbing and the second webbing have different sizes, and
    wherein, in a smaller one of the first webbing and the second webbing, an edge portion at which the bag portion opens is inclined rearwardly upward.

4. The vehicle seat according to claim 1,
    wherein an inflator is provided in the side portion of the seat back, and
    wherein an outlet of the inflator is inserted into the bag portion through an opening of the bag portion.

5. The vehicle seat according to claim 1,
    wherein the first webbing has a first sewn portion on a side opposite to a skin seam portion side,
    wherein the second webbing has a second sewn portion on the side opposite to the skin seam portion side, and
    wherein the bag portion includes the webbing seam portion and a seam portion in which the first sewn portion and the second sewn portion are sewn together.

6. The vehicle seat according to claim 5, wherein a reinforcing cloth portion is sewn to an opening of the bag portion.

* * * * *